(12) United States Patent
Zheng et al.

(10) Patent No.: US 12,130,516 B2
(45) Date of Patent: Oct. 29, 2024

(54) HYBRID DISPLAY DEVICE AND SPLICED DISPLAY DEVICE

(71) Applicant: TCL CHINA STAR OPTOELECTRONICS TECHNOLOGY CO., LTD., Guangdong (CN)

(72) Inventors: Feng Zheng, Guangdong (CN); Wenxue Huo, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,525

(22) PCT Filed: Apr. 15, 2022

(86) PCT No.: PCT/CN2022/086953
§ 371 (c)(1),
(2) Date: Apr. 29, 2022

(87) PCT Pub. No.: WO2023/173527
PCT Pub. Date: Sep. 21, 2023

(65) Prior Publication Data
US 2024/0168328 A1 May 23, 2024

(30) Foreign Application Priority Data
Mar. 18, 2022 (CN) .......................... 202210271182.0

(51) Int. Cl.
*G02F 1/13357* (2006.01)
*G02F 1/1333* (2006.01)
(Continued)

(52) U.S. Cl.
CPC .... *G02F 1/133603* (2013.01); *G02F 1/13336* (2013.01); *G02F 1/133614* (2021.01); *G02F 1/1339* (2013.01); *G02F 2202/28* (2013.01)

(58) Field of Classification Search
None
See application file for complete search history.

(56) References Cited

U.S. PATENT DOCUMENTS

2010/0187975 A1* 7/2010 Tsukahara ............. G02F 1/1336
313/503
2016/0202523 A1 7/2016 Xia et al.
(Continued)

FOREIGN PATENT DOCUMENTS

CN 105044964 A 11/2015
CN 110231735 A 9/2019
(Continued)

OTHER PUBLICATIONS

International Search Report in International application No. PCT/CN2022/086953, mailed on Nov. 30, 2022.
(Continued)

*Primary Examiner* — Richard H Kim
(74) *Attorney, Agent, or Firm* — PV IP PC; Wei Te Chung

(57) ABSTRACT

A hybrid display device and a spliced display device are provided. The hybrid display device includes a display panel and a light-emitting module. The light-emitting module includes a backlight module and a display module. The backlight module is disposed corresponding to a display area, and the display module is disposed corresponding to a border area and is configured for image display in the border area. The light-emitting module integrates the backlight module for providing backlight to the display area and the display module for displaying images in the border area.

13 Claims, 3 Drawing Sheets

(51) Int. Cl.
G02F 1/1335 (2006.01)
G02F 1/1339 (2006.01)

(56) References Cited

U.S. PATENT DOCUMENTS

2019/0121193 A1* 4/2019 Ono .................. G02F 1/017
2022/0057547 A1* 2/2022 Kim ............. G02F 1/133603

FOREIGN PATENT DOCUMENTS

| | | |
|---|---|---|
| CN | 111290154 A | 6/2020 |
| CN | 111653207 A | 9/2020 |
| CN | 111999924 A | 11/2020 |
| CN | 212934616 U | 4/2021 |
| CN | 112908188 A | 6/2021 |
| CN | 113270049 A | 8/2021 |
| CN | 113703211 A | 11/2021 |
| CN | 113707034 A | 11/2021 |
| CN | 113763823 A | 12/2021 |
| KR | 20150031623 A | 3/2015 |

OTHER PUBLICATIONS

Written Opinion of the International Search Authority in International application No. PCT/CN2022/086953, mailed on Nov. 30, 2022.
Chinese Office Action issued in corresponding Chinese Patent Application No. 202210271182.0 dated Apr. 24, 2022, pp. 1-8.

* cited by examiner

HYBRID DISPLAY DEVICE AND SPLICED DISPLAY DEVICE

BACKGROUND OF INVENTION

1. Field of Invention

The present application relates to a technical field of displays, and particularly to a hybrid display device and a spliced display device.

2. Related Art

Micro light-emitting diode (micro-LED) display technologies have developed into popular one of display technologies in the future. Compared with current liquid crystal display (LCD) and organic light-emitting diode (OLED) display devices, micro-LEDs have advantages of quick response times, a high color gamut, high pixels per inch (PPI), and low energy consumption. However, there are many technical difficulties in micro-LED technologies, and the micro-LED technologies are complex. Particularly, the key technology of mass transfer technology and LED particle miniaturization in the micro-LED technologies have become technical bottlenecks.

Sub-millimeter light-emitting diodes (mini light-emitting diodes, mini-LEDs), as products of micro-LEDs and backplanes, have characteristics of high contrast ratios and high color rendering performance comparable to OLEDs and are slightly higher than LCDs in cost, but only about 60% of OLEDs in cost. Compared with micro-LEDs and OLEDs, mini-LEDs are easier to implement, so they have become the focus in outlining for major panel manufacturers. The micro-LED and mini-LED technologies are collectively defined as MLED technology, which is a technology that transfers LEDs to backplanes, and then devices on the backplanes are configured to drive the LEDs to emit light. Such products can be used as backlight, and small-pitch MLED products can be directly used as display products.

Due to thickness of sealants, LCD products have the problem of large borders, resulting in poor display images. In addition, large-sized display products formed by splicing LCD products will cause a problem of large seams.

SUMMARY OF INVENTION

An object of the present invention is to provide a hybrid display device and a spliced display device capable of reducing a border width of a display device.

An embodiment of the application provides a hybrid display device, including a display panel including a display surface and a non-display surface arranged oppositely, a display area, and a border area. A light-emitting module is disposed on a side of the non-display surface facing away from the display surface and includes a backlight module and a display module. The backlight module is disposed corresponding to the display area, the display module is disposed corresponding to the border area, the border area is light-transmissive, and the display module is configured for image display in the border area.

Optionally, in some embodiments provided in this application, the display panel includes an array substrate, a liquid crystal layer, an opposite substrate, and a sealant, wherein the array substrate is arranged opposite to the opposite substrate, the sealant is connected between the array substrate and the opposite substrate and disposed corresponding to the border area and has light transmittance greater than 70%, and the liquid crystal layer is arranged between the array substrate and the opposite substrate and disposed corresponding to the display area.

Optionally, in some embodiments provided in this application, the light-emitting module further includes a base substrate, and the backlight module and the display module are disposed adjacently on the base substrate.

Optionally, in some embodiments provided in this application, the light-emitting module includes a light-emitting structure and a circuit structure, the light-emitting structure is disposed on a side of the circuit structure close to the display panel, and the circuit structure controls light emission of the light-emitting structure.

Optionally, in some embodiments provided in this application, the light-emitting structures in the backlight module emit white light.

Optionally, in some embodiments provided in this application, the backlight module further includes a color conversion film disposed on a side of the light-emitting structure close to the display area, the light-emitting structure of the backlight module emits blue light, and the blue light is converted into white light by the color conversion film.

Optionally, in some embodiments provided in this application, the display module further includes a light conversion layer disposed on a side of the light-emitting structure close to the border area.

Optionally, in some embodiments provided in this application, the light conversion layer includes a first light conversion sublayer, a second light conversion sublayer, and a light-transmissive hole arranged in a same layer, and colors of light excited by the first light conversion sublayer and the second light conversion sublayer are different.

Optionally, in some embodiments provided in this application, 9. the light conversion layer further includes a light guide layer disposed in the light-transmissive hole.

Optionally, in some embodiments provided in this application, the light-emitting structure emits blue light, the first light conversion sublayer emits red light under excitation of the blue light, the second light conversion sublayer emits green light under excitation of the blue light, and the light-transmissive hole is configured to direct the blue light outwardly.

Optionally, in some embodiments provided in this application, the light conversion layer includes a first light conversion sublayer, a second light conversion sublayer, and a third light conversion sublayer arranged in a same layer. Colors of light excited by the first light conversion sublayer, the second light conversion sublayer, and the third light conversion sublayer are different.

Optionally, in some embodiments provided in this application, a projection area of the display module on the non-display surface is equal to an area of the border area, and the sealant is correspondingly disposed on the light-emitting surface of the display module.

Correspondingly, embodiments of the present application further provide a spliced display device, including at least two hybrid display devices spliced together. Each of the hybrid display device include a display panel including a display surface and a non-display surface arranged oppositely, a display area, and a border area. A light-emitting module is disposed on a side of the non-display surface facing away from the display surface and includes a backlight module and a display module. The backlight module is disposed corresponding to the display area, the display module is disposed corresponding to the border area, the border area is light-transmissive, and the display module is configured for image display in the border area. There are two border areas adjoining each other and defining a spliced region.

Optionally, in some embodiments provided in this application, the spliced display device further includes an optical clear adhesive, and a seam further located between two display modules adjoining each other. The optical clear adhesive is applied in the seam without extending beyond the display surface.

Optionally, in some embodiments provided in this application, the spliced display device further includes an optical clear adhesive applied between two display modules and the non-display surface.

Optionally, in some embodiments provided in this application, the display panel includes an array substrate, a liquid crystal layer, an opposite substrate, and a sealant, wherein the array substrate is arranged opposite to the opposite substrate, the sealant is connected between the array substrate and the opposite substrate and disposed corresponding to the border area and has light transmittance greater than 70%, and the liquid crystal layer is arranged between the array substrate and the opposite substrate and disposed corresponding to the display area.

Optionally, in some embodiments provided in this application, the light-emitting module further includes a base substrate, and the backlight module and the display module are disposed adjacently on the base substrate.

Optionally, in some embodiments provided in this application, the light-emitting module includes a light-emitting structure and a circuit structure, the light-emitting structure is disposed on a side of the circuit structure close to the display panel, and the circuit structure controls light emission of the light-emitting structure.

Optionally, in some embodiments provided in this application, the light-emitting structures in the backlight module emit white light.

Optionally, in some embodiments provided in this application, the backlight module further includes a color conversion film disposed on a side of the light-emitting structure close to the display area, the light-emitting structure of the backlight module emits blue light, and the blue light is converted into white light by the color conversion film.

The present application has advantageous effects as follows: embodiments of the present application provide the hybrid display device and the spliced display device. The hybrid display device includes the display panel and the light-emitting module. The light-emitting module is disposed on the side of the non-display surface of the display panel facing away from the display surface. The light-emitting module integrates the backlight module for providing backlight to the display area and the display module for displaying images in the border area. Such a design can narrow a border of the display panel when displaying images and can further improve assembly accuracy of the light-emitting module and the display panel. In addition, since the backlight module and the display module are equipped with same light-emitting elements, continuity of images is better.

BRIEF DESCRIPTION OF DRAWINGS

In order to better illustrate the technical solutions in the embodiments of the present application, the following will briefly introduce the accompanying drawings that need to be used in the description of the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application. It should be understood that the specific embodiments described here are only used to illustrate the present application, and are not used to limit the present application. In this application, if no explanation is made to the contrary, the orientation words used, such as "upper" and "lower" usually refer to the upper and lower positions of the device in actual use or working state. Specifically, they refer to the direction of the drawings, and "inner" and "outer" refer to the outline of the device.

Embodiments of the present application provide a hybrid display device and a spliced display device. Detailed descriptions are given below. It should be noted that the description order of the following embodiments is not intended to limit the preferred order of the embodiments.

Figure 1:
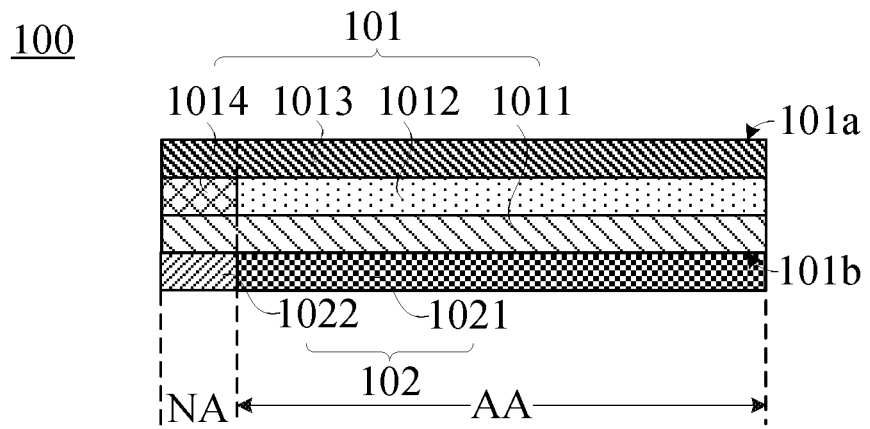
FIG. 1 is a first schematic structural view of a hybrid display device provided by an embodiment of the present application.
Figure 2:
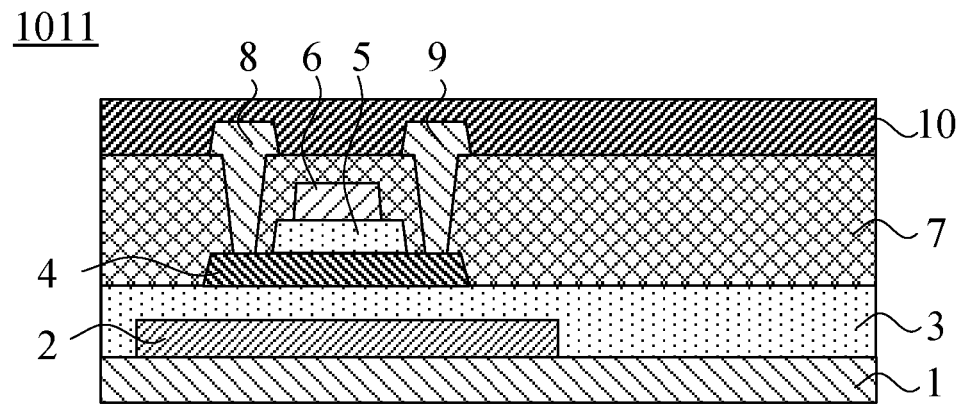
FIG. 2 is a schematic structural view of an array substrate of a hybrid display device provided in an embodiment of the present application.

Referring to FIGS. 1 and 2, FIG. 1 is a first schematic structural view of a hybrid display device provided in an embodiment of the present application. FIG. 2 is a schematic structural view of an array substrate of the hybrid display device provided in the embodiment of the present application. Embodiments of the present application provide a hybrid display device 100 includes a display panel 101 and a light-emitting module 102. The display panel 101 has a display surface 101a and a non-display surface 101b disposed opposite to each other. The display panel 101 has a display area AA and a border area NA. Two adjacent border areas NA of two display panels form a spliced region S. The border area NA is light-transmissive. The light-emitting module 102 is disposed on a side of the non-display surface 101b facing away from the display surface 101a. The light-emitting module 102 includes a backlight module 1021 and a display module 1022. The backlight module 1021 is disposed corresponding to the display area AA. The display module 1022 is disposed corresponding to the frame area NA. The display module 1022 is configured for image display in the border area NA.

Embodiments of the present application provide the hybrid display device 100 includes the display panel 101 and the light-emitting module 102. The light-emitting module 102 is disposed on the side of the non-display surface 101b of the display panel 101 facing away from the display surface 101a. The light-emitting module 102 integrates the backlight module 1021 for providing backlight to the display area AA and the display module 1022 for displaying images in the border area NA. Such a design can narrow a border of the display panel 101 when displaying images, and can further improve assembly accuracy of the light-emitting module 102 and the display panel 101. In addition, since the backlight module 1021 and the display module 1022 are equipped with same light-emitting elements, continuity of images is better.

Specifically, the display surface 101a referred to in the embodiments of the present application refers to a side of the display panel 101 for displaying images, and the non-display surface 101b refers to a side opposite to the display surface 101a. Specifically, the display module 1022 is also configured for image display on the display surface 101a. That is, the display surface 101a not only covers the display area AA of the display panel 101, but also covers the frame area NA of the display panel 101.

Optionally, the display panel 101 includes an array substrate 1011, a liquid crystal layer 1012, an opposite substrate 1013, and a sealant 1014. The array substrate 1011 is disposed opposite to the opposite substrate 1013. The sealant 1014 is connected between the array substrate 1011 and the opposite substrate 1013 and is disposed corresponding to the border area NA. The sealant 1014 has light transmittance greater than 70%. The liquid crystal layer 1012 is disposed between the array substrate 1011 and the opposite substrate 1013. The liquid crystal layer 1012 is disposed corresponding to the display area AA.

Since the display module 1022 provided in the embodiment of the present application is disposed on the non-display surface 101b and corresponding to the border area NA, the display module 1022 is also disposed corresponding to the sealant 1014. In order to ensure that images displayed by the display module 1022 can be normally provided on the display surface 101a, a material of the sealant 1014 needs to be selected to ensure that the light transmittance of the sealant 104 is greater than 70%. An optical effect in the spliced region S of the hybrid display device 100 is improved. Specifically, the sealant 1014 covers the spliced region S. In this way, the light transmittance of the entire spliced region S can be guaranteed, and the display module 1022 disposed corresponding to the spliced region S can be displayed normally on the display surface.

Specifically, the light transmittance of the sealant 1014 may be 70%, 75%, 80%, 85%, 90%, 95%, or 98%. The material of the sealant 1014 is prior art well known to those skilled in the art, so it is not repeated here.

Optionally, the border area NA is designed without metal traces and a black matrix (BM). That is, the border area NA is formed by filling the sealant 1014. Since the sealant 1014 is made of a material with light transmittance of more than 70%, it can be ensured that the display of the display module 1022 is not hindered by the border area NA. Optionally, a metal wiring can be configured on a back of the display panel 101.

Optionally, the disposition of the display module 1022 corresponding to the border area NA may mean that a projection area of the display module 1022 on the non-display surface 101b is equal to an area of the border area NA, so that the display module 1022 completely covers the border area NA. Such a design can prevent the display module 1022 from affecting backlight output by the backlight module 1021.

In a product, a limit error is allowed for the display module 1022 and the border area NA. Specifically, the display module 1022 may deviate inward or outward by 0 microns (μm) to 300 μm on at least one side of the border area NA. In detail, an error value may be 0 μm, 10 μm, 20 μm, 30 μm, 40 μm, 50 μm, 60 μm, 70 μm, 80 μm, 90 μm, 100 μm, 150 μm, 200 μm, 250 μm, or 300 μm. This error may be due to a difference value between the projection area of the display module 1022 on the non-display surface 101b and the area of the border area NA, or due to the deviation of alignment, which is not limited in this application. In addition, such an error range can prevent an offset error of a polarizer from adversely affecting the polarizer.

It should be noted that an occurrence of an inward deviation of the display module 1022 from at least one side of the border area NA may mean that the orthographic projection of the display module 1022 on the non-display surface 101b is located within the border area NA. Alternatively, the display module 1022 is aligned and deviated to a certain side of the border area NA, so that the display module 1022 is deviated inward by a distance from one side of the border area NA and is deviated outward by the same distance from an opposite side of the border area NA.

Optionally, the deviation distance of the display module 1022 inward or outward at a peripheral side of the border area NA is 0 μm. That is, the display module 1022 does not deviate on the peripheral side of the border area NA. At this time, the display module 1022 is disposed completely corresponding to the border area NA and covers the border area NA.

Specifically, please refer to FIG. 2. The array substrate 1011 includes a substrate 1, a light shielding layer 2 disposed on the substrate 1, and a buffer layer 3 disposed on the substrate and covering the light shielding layer 2; an active layer 4, a gate insulating layer 5, and a gate layer 6 sequentially laminated on the buffer layer 3 from bottom to top; an interlayer dielectric layer 7 is located above the buffer layer 3 and covers the active layer 4, the gate insulating layer 5, and the gate layer 6. A source electrode 8 and a drain electrode 9 located on the interlayer dielectric layer 7 are electrically connected to the active layer 4, respectively. The source electrode 8 and the drain electrode 9 are further covered with a planarization layer 10. The array substrate 1011 may also include other structures such as pixel electrodes. A structure and specific arrangement of the array substrate 1011 are technical means commonly used in the art, and will not be repeated here.

It should be noted that a structure of a thin-film transistor formed in the array substrate 1011 is not limited in this application. The thin-film transistor may be a top gate thin-film transistor or a bottom gate thin-film transistor. Alternatively, the thin-film transistor may be a dual gate type thin-film transistor or a single gate type thin film transistor. A specific structure of the thin-film transistor will not be repeated in this application. Optionally, the thin-film transistor of the array substrate 1011 of the present application can be a top gate type thin-film transistor. A top gate thin-film transistor has lower parasitic capacitance and better ductility because there is no overlap between the source electrode 8, the drain electrode 9, and the gate layer 6, so that delay in signal transmission can be reduced. In addition, a self-aligned fabrication method is used to facilitate fabrication of short-channel devices, thereby improving device characteristics.

Specifically, the active layer 4 may be made of a material including indium gallium zinc oxide (IGZO), indium zinc tin oxide (IZTO), indium gallium zinc tin oxide (IGZTO), indium tin oxide (ITO), indium zinc oxide (IZO), indium aluminum zinc oxide (IAZO), indium gallium tin oxide (IGTO), or antimony tin oxide (ATO). The above-mentioned materials have good conductivity and transparency, high electron mobility, and small thickness, thus hardly affecting an overall thickness of the display panel. In addition, they can also reduce harmful electron radiation, ultraviolet, and infrared light to humans.

Optional, please continue referring to FIG. 1. A filter layer and a polarizing layer (not shown) are provided on the opposite substrate 1013. The display panel 101 can emit red, green, and blue light for display. For example, when the display panel 101 displays green, red, green, and blue light pass through a lower polarizing layer on the array substrate 1011 to form polarized light and enter the liquid crystal layer 1012. In different subpixels, the liquid crystal layer 1012 has different inversions. The liquid crystal layer 1012 controls filtering of green subpixels to pass through, and blocks red and blue light of adjacent subpixels. Since light conversion efficiency cannot reach 100%, there may be some unconverted blue light passing through the green subpixels in liquid crystal layer 1012. This part of the blue light will be filtered by the filter layer. By using the above-mentioned opposite substrate 1013, color crosstalk is prevented, color purity is improved, and display effects are enhanced.

Figure 3:
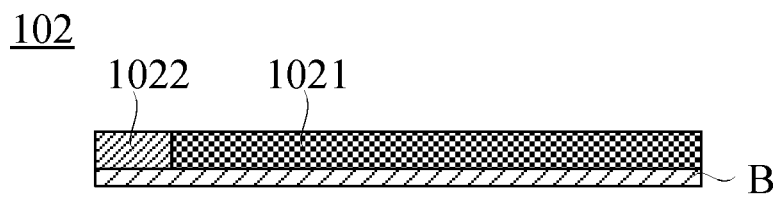
FIG. 3 is a first schematic structural view of a light-emitting module of a hybrid display device provided in an embodiment of the present application.

Optional, please refer to FIG. 3, which is a first schematic structural view of a light-emitting module of the hybrid display device provided in an embodiment of the present application. The light-emitting module 102 further includes a base substrate B. The backlight module 1021 and the display module 1022 are disposed adjacent to each other on the substrate B. Specifically, the base substrate B is a fundamental member for supporting the backlight module 1021 and the display module 1022. Such a design can reduce space occupied by the backlight module 102 in a thickness direction, and improve light and thin characteristics of the hybrid display device 100.

Figure 4:
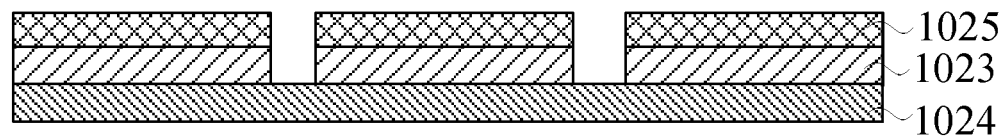
FIG. 4 is a second schematic structural view of a light-emitting module of a hybrid display device provided in an embodiment of the present application.

Optionally, please refer to FIG. 4, which is a second schematic structural view of a light-emitting module of the hybrid display device provided in an embodiment of the present application. Each of the backlight module 1021 and the display module 1022 includes a light-emitting structure 1023 and a circuit structure 1024. The light-emitting structure 1023 is disposed on a side of the circuit structure 1024 close to the display panel 101. The circuit structure 1024 controls light emission of the light-emitting structure 1023. Specifically, the circuit structure 1024 may be a printed circuit board (PCB).

Optionally, the light-emitting structure 1023 is one or a combination of a light-emitting diode (LED) element, a micro light-emitting diode (micro-LED) element, or a sub-millimeter light-emitting diode element (mini-LED). The display module 1022 uses small-sized light-emitting diodes, such as micro-LED and mini-LED, to emit light for display. By means of improved processes and panel design, it is possible to fabricate micro-LED light-emitting structures and mini-LED light-emitting structures with smaller pitches. When a pitch between light-emitting diodes of the micro-LED light-emitting structure and the mini-LED light-emitting structure is reduced, on one hand, higher resolution display can be realized in a narrow border area NA, and the display effect can be enhanced; on the other hand, a borderless effect can be achieved visually, which is better integrated with the display of the display panel 101, making displayed images more continuous and complete.

Specifically, width of the border area NA may be determined according to width of the display module 1022. When fabricating the border area NA of the display panel 101, the width of the display module 1022 can be calculated first. Since the display module 1022 can be formed by using LED chips, size and spacing of the LED chips can be determined. Therefore, the width of the display module 1022 is known.

The width of the border area NA is determined by the width of the display module 1022, which can better ensure that the projection area of the display module 1022 on the non-display surface 101*b* is equal to the area of the border area NA. Thus, an effect of narrowing the border of the display module 1022 can be improved.

Specifically, LED components, micro-LED components, or mini-LED components are transferred to a PCB, then a side of 1024. the PCB provided with the LED components, the micro-LED components, or the mini-LED components is adhesively attached to the non-display surface 101*b*. Therefore, splicing of the backlight module 102 and the display panel 101 is achieved.

In addition, in order to achieve better alignment, an alignment fixture may be used to align and splice the backlight module 102 and the display panel 101. A specific alignment method will be described in more detail in the introduction to the alignment fixture, which can be referred to below, and will not be repeated here.

In some embodiments, the light-emitting structures 1023 in the backlight module 1021 emit white light. Optionally, the display panel 101 is a liquid crystal display (LCD) panel. Light-emitting diodes emitting white light can be used in the backlight module 1021 to serve as the light-emitting structure 1023 for a backlight source of the display panel 101. The light-emitting structure 1023 directly emits white light to reduce the loss of light and lower power loss.

In some embodiments, please continue referring to FIG. 4. The light-emitting structure 1023 in the backlight module 1021 emits blue light. The backlight module 1021 further includes a color conversion film 1025. The color conversion film 1025 is disposed on a side of the light-emitting structure 1023 close to the display panel 101. After blue light is being excited, white light is mixed by the color conversion film 1025 and thus is emitted from the color conversion film 1025.

Specifically, the color conversion film 1025 may be a quantum dot thin film. A particle size of a quantum dot (QD) material is generally between 1 nanometer (nm) and 10 nm. Due to quantum confinement on electrons and holes, a continuous energy band structure becomes a discrete energy level structure, which makes an emission spectrum of quantum dot materials very narrow. Therefore, a light-emitting color of quantum dots has high color purity and a wide display color gamut. The color purity of the white light emitted after conversion by a quantum dot film is higher, which can improve the display effect of the display panel 101.

Optionally, the display module 1022 may directly use light-emitting diodes that emit red light, blue light, and green light for display.

Figure 5:
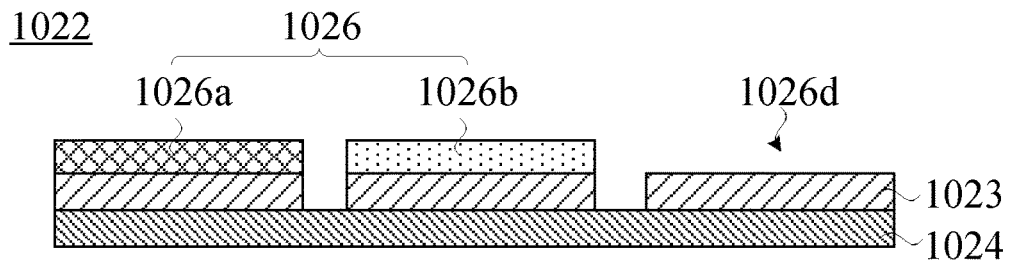
FIG. 5 is a first schematic structural view of a display module of a hybrid display device provided in an embodiment of the present application.

In some embodiments, please refer to FIG. 5, which is a first schematic structural view of a display module of a hybrid display device provided in an embodiment of the present application. The display module 1022 further includes a light conversion layer 1026. The light conversion film 1026 is disposed on the side of the light-emitting structure 1023 close to the display panel 101. Specifically, the light conversion layer 1026 may be a quantum dot layer. A particle size of a quantum dot (QD) material is generally between 1 nanometer (nm) and 10 nm. Due to quantum confinement on electrons and holes, a continuous energy band structure becomes a discrete energy level structure, which makes an emission spectrum of quantum dot materials very narrow. Therefore, a light-emitting color of quantum dots has high color purity and a wide display color gamut. At a same time, the light loss through the sealant 1014 is less, so that low power consumption display can be achieved.

Specifically, the light conversion layer 1026 may also be an up-conversion material. Up-conversion materials are a class of materials that can emit short-wavelength light under the excitation of long-wavelength light. Such materials are mostly excited by near-infrared light to emit visible light. Near-infrared light sources have a high penetration depth. The up-conversion materials have many advantages, such as large anti-Stokes shift, long fluorescence service life, high photostability, strong chemical stability, and high signal-to-noise ratio.

Further, between the light conversion layers 1026 of different colors, a black photoresist layer (i.e., black matrix, BM) may be provided, which is not shown in the drawings. The disposition of the BM can separate the light conversion layers 1026 of different colors, so as to better prevent light mixing.

Optionally, the light conversion layer 1026 has a first light conversion sublayer 1026a, a second light conversion sublayer 1026b, and a light-transmissive hole 1026d which are arranged in a same layer. Colors of light emitted from the first light conversion sublayer 1026a and the second light conversion sublayer 1026b are different from each other.

Optionally, the display module 1022 can emit red, green, and blue light. For example, the light emitting structure 1023 is a blue LED, a blue micro-LED, or a blue Mini-LED. That is, the light emitting structure 1023 emits blue light. The first light conversion sublayer 1026a emits red light when excited by blue light. The second light conversion sublayer 1026b emits green light when excited by blue light. The light-transmissive hole 1026d is configured to direct and output blue light.

It should be noted that, in the display panel 101 provided in this embodiment, a transparent photoresist layer may be provided in the light-transmissive hole 1026d, so as to keep the display module 1022 from falling over and not affecting a light exit direction. At least part of the transparent photoresist layer is filled in the light-transmissive holes 1026d. That is, the transparent photoresist layer is partially filled in the light-transmissive hole 1026d to play a role in supporting. Alternatively, the transparent photoresist layer may fill up the light-transmissive hole 1026d to ensure that light can pass normally.

In the display module 1022 provided in this embodiment, the light-transmissive hole 1026d is formed in the light conversion layer 1026. In the case where an incident light may not undergo color conversion, since the incident light directly exits through the light-transmitting hole 1026d, a light utilization rate can be improved.

Figure 6:
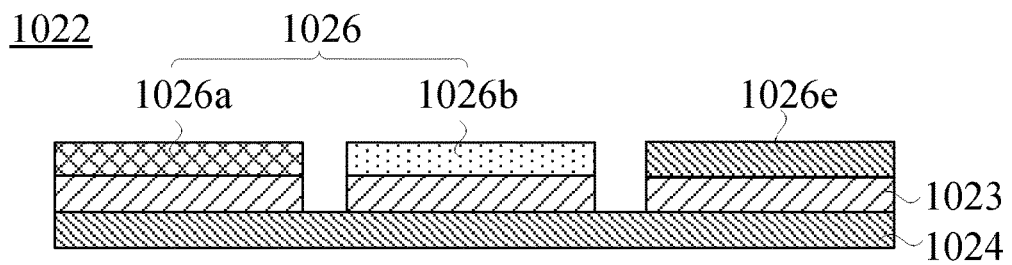
FIG. 6 is a second schematic structural view of a display module of a hybrid display device provided in an embodiment of the present application.

Optional, please refer to FIG. 6, which is a second schematic structural view of a display module of a hybrid display device provided in an embodiment of the present application. The light conversion layer 1026 further has a light guide layer 1026e. The light guide layer 1026e is disposed in the light-transmissive hole 1026d. Optionally, a side of the light guide layer 1026e close to the light-emitting structure 1023 has a microstructure. The microstructures can be any tiny structures that can reflect or refract light. For example, there are many tiny spheres, hemispheres, diamond-like structures, pyramids, or irregular rough surfaces.

In some embodiments, a plurality of scattering particles are disposed in the light guide layer 1026e. After the scattering particles are arranged in the light guide layer 1026e, the light can be converted into a form of scattering, random reflection, or diffuse reflection by means of the scattering of the scattering particles to optimize the degree of light divergence of the incident light, so that the light can be projected in all directions after passing through the light guide layer 1026e, thereby increasing the uniformity of the light.

In some embodiments, the light guide layer 1026e is an anisotropic optical film. In the anisotropic optical film, a plurality of structures having a refractive index different from that of a matrix region of the film are formed in a film thickness direction. Light passes through these structures, causing refraction and scattering in different directions.

It can be seen from the above that the light guide layer 1026e is different from the light-transmissive hole 1026d in FIG. 5. After the light passes through the light-transmissive hole 1026d, an original direction of the light will not be changed. After the light passes through the light guide layer 1026e, the incident light in different directions can pass through the sealant 1014 through the light guide layer 1026e, which improves the light utilization rate. In addition, after the light passing through the light guide layer 1026e is reflected, refracted, and scattered by the light guide layer 1026e, the emitted light is more uniform and has higher brightness.

Optionally, the display module 1022 can emit red, green, and blue light. For example, the first light conversion sublayer 1026a may emit red light when excited by light. The second light conversion sublayer 1026b can emit green light when excited by light. The light guide layer 1026e can pass blue light.

The display module 1022 provided in this embodiment is provided with the light guide layer 1026e in the light-transmissive hole 1026d. After the light enters the light guide layer 1026e, the light is diffused to various angles, and then exits from a front of the light guide layer 1026e through refraction, scattering, and the like. The light guide layer 1026e can make light output more uniform. Under a condition of a same area of luminous brightness, using the light guide layer 1026e has high luminous efficiency and low power consumption. Specifically, the light guide layer 1026e in the embodiment of the present application may be fabricated by a one-step process with a light guide layer in the backlight module 1021. While saving process steps and costs, the light emitted by the backlight module 1021 and the display module 1022 can be made more uniform.

It should be noted that, the light guide layer 1026e can be further extended to a side of the light-emitting structure 1023 close to the spliced region S after filling the light-transmissive hole 1026d, so that a light guide effect on the light emitted from the first light conversion sublayer 1026a and the second light conversion sublayer 1026*b* can also be achieved by the light guide layer 1026*e*.

Figure 7:
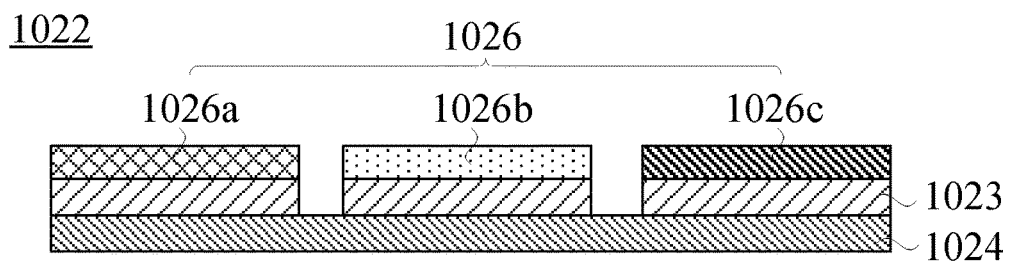
FIG. 7 is a third schematic structural view of a display module of a hybrid display device provided in an embodiment of the present application.

Optional, please refer to FIG. 7, which is a third schematic structural view of a display module of a hybrid display device provided in an embodiment of the present application. The light conversion layer 1026 has a first light conversion sublayer 1026*a*, a second light conversion sublayer 1026*b*, and a third light conversion sublayer 1026*c* disposed in the same layer. Colors of light emitted from the first light conversion sublayer 1026*a*, the second light conversion sublayer 1026*b*, and the third light conversion sublayer 1026*c* are different from each other.

Optionally, the display module 1022 can emit red, green, and blue light. The light-emitting structure 1023 may be a light-emitting structure 1023 that emits laser light, or an LED component that emits white light. The first light conversion sublayer 1026*a* emits red light when excited by light emitted by the light-emitting structure 1023, the second light conversion sublayer 1026*b* emits green light when excited by the light emitted by the light-emitting structure 1023, and the third light conversion sublayer 1026*c* emits blue light when excited by the light emitted by the light-emitting structure 1023.

In some embodiments, the hybrid display device 100 may further be configured with four pixel colors of red, green, blue, and white (RGBW). In the case that the light emitting structure 1023 emits white light, the light conversion layer 1026 may include a first light conversion sublayer 1026*a*, a second light conversion sublayer 1026*b*, a third light conversion sublayer 1026*c*, and a light-transmissive hole 1026*d* all disposed in a same layer. In this way, the first light conversion sublayer 1026*a* can emit red light under an excitation of a backlight, the second light conversion sublayer 1026*b* can emit green light under the excitation of the backlight, the third light conversion sublayer 1026*c* can emit blue light under the excitation of the backlight, and the light-transmissive hole 1026*d* allows white light to pass through. A specific display manner is the same as the above, and will not be repeated here. Similarly, a light guide layer 1026*e* may be provided in the light-transmissive hole 1026*d* to achieve better display performance.

It should be noted that the color of the light emitted from the first light conversion sublayer 1026*a*, the second light conversion sublayer 1026*b*, and the third light conversion sublayer 1026*c* is only an example, which is not intended to limit an arrangement order of the red, green, and, blue light.

Optionally, the color conversion film 1025 in the backlight module 1021 and the light conversion layer 1026 in the display module 1022 can be made of a same material. Because the light emitting module 102 provided in the embodiment of the present application integrates the backlight module 1021 and the display module 1022, when both the backlight module 1021 and the display module 1022 need to be provided with a light conversion layer and a color conversion film, the backlight module 1021 and the display module 1022 can be fabricated with a same light-emitting structure. For example, blue mini-LEDs are used to constitute the backlight module 1021 and the display module 1022, and then the color conversion film 1025 and the light conversion layer 1026 are fabricated through a same process to achieve the integration of the light-emitting module 102.

Figure 8:
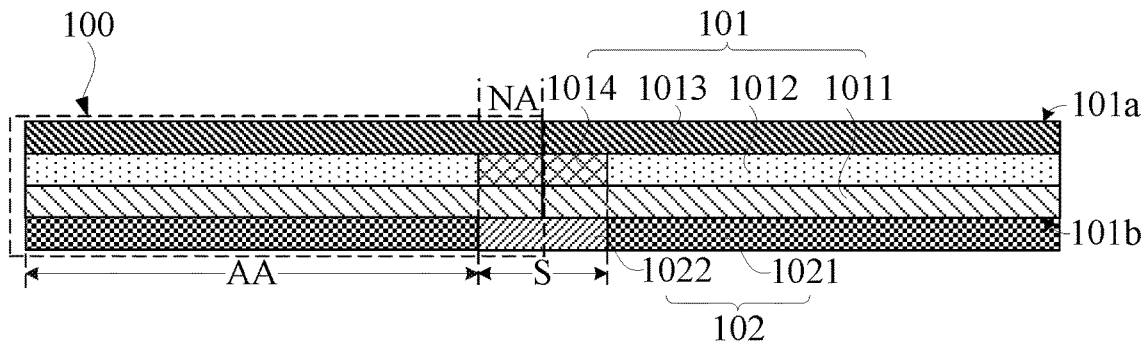
FIG. 8 is a first schematic structural view of a spliced display device provided in an embodiment of the present application.

Correspondingly, the embodiments of the present application further provide a spliced display device. Referring to FIG. 8, FIG. 8 is a first schematic structural view of a spliced display device provided in an embodiment of the present application. A spliced display device 1000 includes at least two hybrid display devices 100 spliced together. The hybrid display device 100 is the hybrid display device 100 described in the aforementioned embodiments. Two border areas NA adjoining each other form a spliced region S.

The spliced display device 1000 provided in the embodiments of the present application includes at least two hybrid display devices 100 spliced together. Each of the hybrid display devices 100 includes a display panel 101 and a light-emitting module 102. The light-emitting module 102 is disposed on a side of a non-display surface 101*b* of the display panel 101 facing away from a display surface 101*a*. The light-emitting module 102 integrates the backlight module 1021 for providing backlight to the display panel 101 and the display module 1022 for displaying images in the spliced region. Such a design enables the spliced display device 1000 to have a seamless display effect when displaying images, and can further improve assembly accuracy of the light-emitting module 102 and the display panel 101, and make displayed images more continuous. Therefore, image integration between the display panel 101 and a seam is realized, so that images can also be displayed normally in the spliced region S.

Secondly, by integrating the backlight module 1021 for providing the backlight and the display module 1022 for displaying the images in the spliced region S through the light-emitting module 102, lengthy processes of adhering a light bar to the seam for hiding the seam can be omitted, and the mass production of the spliced display device 1000 can be improved.

Specifically, width of the spliced region S may be determined according to width of the display module 1022. The spliced region S is formed by splicing two adjacent border areas NA of the display panels 101 spliced together. When fabricating the border area NA of the display panel 101, the width of the display module 1022 can be calculated first. Since the display module 1022 can be formed by using LED chips, size and spacing of the LED chips can be determined. Therefore, the width of the display module 1022 is known.

The width of the spliced region S is determined by the width of the display module 1022, which can better ensure that a projection area of the display module 1022 on the non-display surface 101*b* is equal to an area of the spliced region S. Thus, an effect of eliminating seams by the display module 1022 can be improved.

In addition, since the backlight module 1021 for providing the backlight of the display panel 101 and the display module 1022 for displaying the picture in the spliced region S are integrated, optical specifications, such as an image color gamut, chromaticity, and brightness can be improved everywhere in the display panel 101.

Optionally, the projection area of the display module 1022 on the non-display surface 101*b* is equal to the area of the spliced region S, and the sealant 1014 is correspondingly disposed on the light-emitting surface of the display module 1022. Since the display module 1022 is directly used for image display in the border area NA, in order to prevent the display module 1022 from adversely affecting the display of the display panel 101, the projection area of the display module 1022 on the non-display surface 101*b* is equal to the area of the spliced region S. Furthermore, such a design can make the spliced region S achieve the best splicing display effect. The embodiments of the present application are described by taking the projection area of the display module 1022 on the non-display surface 101*b* equal to the area of the spliced region S as an example, but not as a limitation to the embodiments of the present application. The projection area of the display module 1022 on the non-display surface 101*b* may be slightly smaller than the area of the spliced region S, and may also be slightly larger than the area of the spliced region S. Adaptive designs can be made for different display panels 101, and process errors can also be tolerated.

Figure 9:
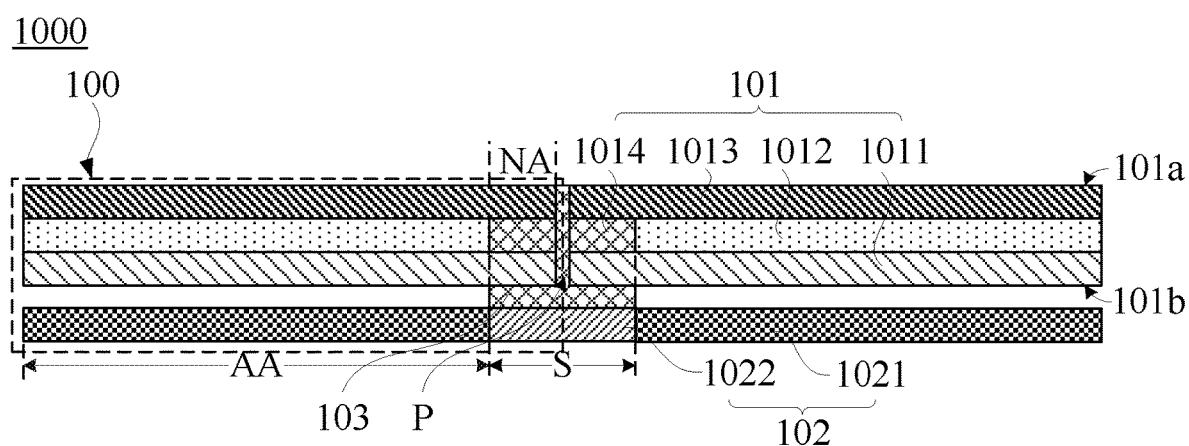
FIG. 9 is a second schematic structural view of a spliced display device provided in an embodiment of the present application.

Optional, please refer to FIG. 9, which is a second schematic structural view of a spliced display device provided in an embodiment of the present application. A seam P is further located between two hybrid display devices 100 adjoining each other. The spliced display device 1000 further includes an optical clear adhesive 103. The optical clear adhesive 103 is applied in the seam P without extending beyond the display surface 101a. On one hand, the optical clear adhesive 103 can diffuse the light of the display module 1022 in the seam P, and when the spliced display device 1000 displays an image, the light in the seam P can be directed to exit in multiple directions, so as to provide a better effect to eliminate the seam. On the other hand, the optical clear adhesive 103 can better connect and seal the two adjacent hybrid display devices 100.

An optical clear adhesive (OCA) can be one of ultraviolet (UV)-curable adhesives or thermoset-curable adhesives. The optical clear adhesive is made of a material including at least one of organic silica gel, acrylic resin, unsaturated polyester, polyurethane, epoxy resin, or other adhesives. In the embodiment of the present application, light transmittance of the optical clear adhesive is greater than 90%.

Further, please continue referring to FIG. 9. The optical clear adhesive 103 can also extend to the non-display surface 100b of the display panel 101 in the seam P and is correspondingly disposed in the spliced region S and is located between the display module 1022 and the non-display surface 101b. The optical clear adhesive 103 extending to the non-display surface 101b can facilitate the connection between the light-emitting module 102 and the non-display surface 101b.

It should be noted that, in an actual product, thickness of the optical clear adhesive 103 extending to the non-display surface 101b is in the order of micrometers or nanometers, and the thickness is exaggerated in the drawings.

The above describes in detail the hybrid display device and the spliced display device provided in the embodiments of the present application. Specific examples are used in this article to illustrate the principles and implementation of the application, and the descriptions of the above examples are only used to help understand the methods and core ideas of the application; In addition, for those skilled in the art, according to the idea of the application, there will be changes in the specific implementation and the scope of application. In summary, the content of this specification should not be construed as a limitation of the application.

What is claimed is:

1. A spliced display device, comprising at least two hybrid display devices spliced together, wherein each of the hybrid display device comprises:
   a display panel comprising a display surface and a non-display surface arranged oppositely, a display area, and a border area; and
   a light-emitting module disposed on a side of the non-display surface facing away from the display surface, and comprising a backlight module and a display module, wherein the backlight module is disposed corresponding to the display area, the display module is disposed corresponding to the border area, the border area is light-transmissive, and the display module is configured for image display in the border area;
   wherein there are two border areas adjoining each other and defining a spliced region; the hybrid display device further comprises an optical clear adhesive and a seam further located between two of the hybrid display devices adjoining each other, and the optical clear adhesive is applied in the seam without extending beyond the display surface.

2. The spliced display device of claim 1, further comprising an optical clear adhesive applied between two display modules and the non-display surface.

3. The spliced display device of claim 1, wherein the display panel comprises an array substrate, a liquid crystal layer, an opposite substrate, and a sealant, wherein the array substrate is arranged opposite to the opposite substrate, the sealant is connected between the array substrate and the opposite substrate and disposed corresponding to the border area and has light transmittance greater than 70%, and the liquid crystal layer is arranged between the array substrate and the opposite substrate and disposed corresponding to the display area.

4. The spliced display device according to claim 3, wherein a projection area of the display module on the non-display surface is equal to an area of the border area, and the sealant is correspondingly disposed on the light-emitting surface of the display module.

5. The spliced display device of claim 1, wherein the light-emitting module further comprises a base substrate, and the backlight module and the display module are disposed adjacently on the base substrate.

6. The spliced display device of claim 1, wherein the light-emitting module comprises a light-emitting structure and a circuit structure, the light-emitting structure is disposed on a side of the circuit structure close to the display panel, and the circuit structure controls light emission of the light-emitting structure.

7. The spliced display device of claim 6, wherein the light-emitting structure of the backlight module emits white light.

8. The spliced display device of claim 6, wherein the backlight module further comprises a color conversion film disposed on a side of the light-emitting structure close to the display area, the light-emitting structure of the backlight module emits blue light, and the blue light is converted into white light by the color conversion film.

9. The spliced display device of claim 6, wherein the display module further comprises a light conversion layer disposed on a side of the light-emitting structure close to the border area.

10. The spliced display device of claim 9, wherein the light conversion layer comprises a first light conversion sublayer, a second light conversion sublayer, and a light-transmissive hole arranged in a same layer, and colors of light excited by the first light conversion sublayer and the second light conversion sublayer are different.

11. The spliced display device of claim 10, wherein the light conversion layer further comprises a light guide layer disposed in the light-transmissive hole.

12. The spliced display device of claim 10, wherein the light-emitting structure emits blue light, the first light conversion sublayer emits red light under excitation of the blue light, the second light conversion sublayer emits green light under excitation of the blue light, and the light-transmissive hole is configured to direct the blue light outwardly.

13. The spliced display device of claim 9, wherein the light conversion layer comprises a first light conversion sublayer, a second light conversion sublayer, and a third light conversion sublayer arranged in a same layer, wherein colors of light excited by the first light conversion sublayer, the second light conversion sublayer, and the third light conversion sublayer are different.

* * * * *